(12) United States Patent
Su et al.

(10) Patent No.: US 9,223,920 B2
(45) Date of Patent: Dec. 29, 2015

(54) METHOD AND APPARATUS FOR TIMING CLOSURE

(71) Applicant: Marvell World Trade Ltd., St. Michael (BB)

(72) Inventors: Jason T. Su, Los Altos, CA (US); Winston Lee, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/200,677

(22) Filed: Mar. 7, 2014

(65) Prior Publication Data

US 2014/0218093 A1  Aug. 7, 2014

Related U.S. Application Data

(63) Continuation of application No. 13/235,908, filed on Sep. 19, 2011, now Pat. No. 8,689,162.

(60) Provisional application No. 61/432,557, filed on Jan. 13, 2011, provisional application No. 61/384,058, filed on Sep. 17, 2010.

(51) Int. Cl.
*G06F 17/50* (2006.01)
*H03K 5/159* (2006.01)
*H03K 5/00* (2006.01)

(52) U.S. Cl.
CPC ........ *G06F 17/5045* (2013.01); *G06F 17/5031* (2013.01); *H03K 5/159* (2013.01); *G06F 2217/84* (2013.01); *H03K 2005/00013* (2013.01)

(58) Field of Classification Search
USPC ........................................................ 716/114
See application file for complete search history.

(56) References Cited

U.S. PATENT DOCUMENTS

| | | | |
|---|---|---|---|
| 5,780,347 A * | 7/1998 | Kapoor ......................... | 438/301 |
| 6,326,812 B1 | 12/2001 | Jefferson | |
| 7,557,626 B1 | 7/2009 | Zortea | |
| 8,255,196 B2 * | 8/2012 | Walker et al. ................... | 703/13 |
| 2009/0108900 A1 | 4/2009 | Sotiriou et al. | |

OTHER PUBLICATIONS

Amrutur et al., "A Replica Technique for Wordline and Sense Control in Low-Power SRAM's," IEEE Journal of Solid-State Circuits, vol. 33, No. 8, Aug. 1998.
Desai et al., "Reducing process variation impact on replica-timed static random access memory sense timing," Integration, the VLSI Journal, vol. 42, pp. 437-448, 2009.
International Search Report and Written Opinion of the International Searching Authority, mailed Dec. 28, 2011 in International Application No. PCT/US2011/052072.

* cited by examiner

*Primary Examiner* — Eric Lee

(57) ABSTRACT

Aspects of the disclosure provide a circuit, such as an integrated circuit. The circuit includes a first circuit and a second circuit. The second circuit includes a delay circuit configured to cause the second circuit to have substantially matched delay characteristics of the first circuit in response to at least one parameter change of manufacturing, environmental and operational parameters, such as process variation, temperature variation, and supply voltage variation.

16 Claims, 7 Drawing Sheets

METHOD AND APPARATUS FOR TIMING CLOSURE

INCORPORATION BY REFERENCE

This application is a continuation of U.S. application Ser. No. 13/235,908, filed on Sep. 19, 2011, which claims priority under 35 U.S.C. §119(e) to U.S. Provisional Application No. 61/384,058, filed on Sep. 17, 2010, and U.S. Provisional Application No. 61/432,557, filed on Jan. 13, 2011. The disclosures of the applications referenced above are incorporated herein by reference in their entireties.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, multi-corner and multi-mode (MCMM) timing closure is a challenging task for high performance IC designs because the timing margins shift from one process corner to another process corner. As a result, an optimal implementation for one process corner can fail to meet the timing requirements or the timing targets at another process corner. It normally takes numerous iterations to eventually make the design meeting one essential timing criterion, such as a hold time across process corners, by compromise of another timing criterion, such as a setup time margin, for example. Therefore, the design cycle is prolonged, and the original speed and power targets are often missed when the timing is closed.

SUMMARY

Aspects of the disclosure provide a circuit, such as an integrated circuit. The circuit includes a first circuit and a second circuit. The second circuit includes a delay circuit configured to cause the second circuit to have substantially matched delay characteristics of the first circuit in response to at least one parameter change of manufacturing, environmental and operational parameters, such as process variation, temperature variation, and supply voltage variation.

According to an embodiment of the disclosure, the first circuit has a first delay that includes a first delay portion having a first delay characteristic and a second delay portion having a second delay characteristic that varies differently from the first delay characteristic in response to the parameter changes of the manufacturing, environmental, and operational parameters. The second circuit has a second delay that includes a first corresponding delay portion having the first delay characteristic and a second corresponding delay portion having the second delay characteristic. The delay circuit of the second circuit is configured to cause a first ratio of the first delay portion and the second delay portion to match a second ratio of the first corresponding delay portion and the second corresponding delay portion. In an example, the first delay characteristic characterizes transistor-switching delay, and the second delay characteristic characterizes passive RC delay.

According to an aspect of the disclosure, the delay circuit includes a portion configured to add passive RC delay. In an example, the portion comprises at least a portion of doped polysilicon, such as n-type doped polysilicon, p-type doped polysilicon, and the like. According to another aspect of the disclosure, the delay circuit includes at least a transistor configured to add transistor-switching delay.

In an embodiment, the delay circuit is configured to be a passive RC delay dominant delay circuit. In another embodiment, the delay circuit is configured to be a transistor switching delay dominant delay circuit.

Aspects of the disclosure provide a method for circuit design. The method includes detecting a mismatch of delay characteristics of a first circuit and a second circuit in response to at least one parameter change of manufacturing, environmental and operational parameters, and inserting a delay circuit in the second circuit to substantially match the delay characteristics of the second circuit with the first circuit.

To detect the mismatch of the delay characteristics, in an embodiment, the method includes detecting a timing violation due to the mismatch of the delay characteristics of the first circuit and the second circuit. In an example, the method includes detecting the timing violation with at least one of process variation, temperature variation, and supply voltage variation.

Further, in an embodiment, delay of the first circuit includes a first delay portion having a first delay characteristic and a second delay portion having a second delay characteristic, and delay of the second circuit includes a first corresponding delay portion having the first delay characteristic and a second corresponding delay portion having the second delay characteristic. The method includes detecting that a first ratio of the first delay portion and the second delay portion of the first circuit does not match a second ratio of the first corresponding delay portion and the second corresponding delay portion of the second circuit.

To insert the delay circuit in the second circuit to substantially match the delay characteristics of the second circuit with the first circuit, the method includes inserting the delay circuit to substantially match the second ratio of the first corresponding delay portion and the second corresponding delay portion of the second circuit with the first ratio of the first delay portion and the second delay portion of the first circuit.

In an embodiment, the first delay characteristic characterizes transistor-switching delay, and the second delay characteristic characterizes passive RC delay. In an example, the method includes inserting a portion configured to add passive RC delay, such as inserting a wire section of polysilicon. The wire section of polysilicon can be n-type doped polysilicon or p-type doped polysilicon. In another example, the method includes inserting at least a transistor configured to add transistor-switching delay to reduce a transistor-switching delay mismatch. In another example, the method includes inserting the delay circuit that is transistor switching delay dominant. In another example, the method includes inserting the delay circuit that is passive RC delay dominant.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
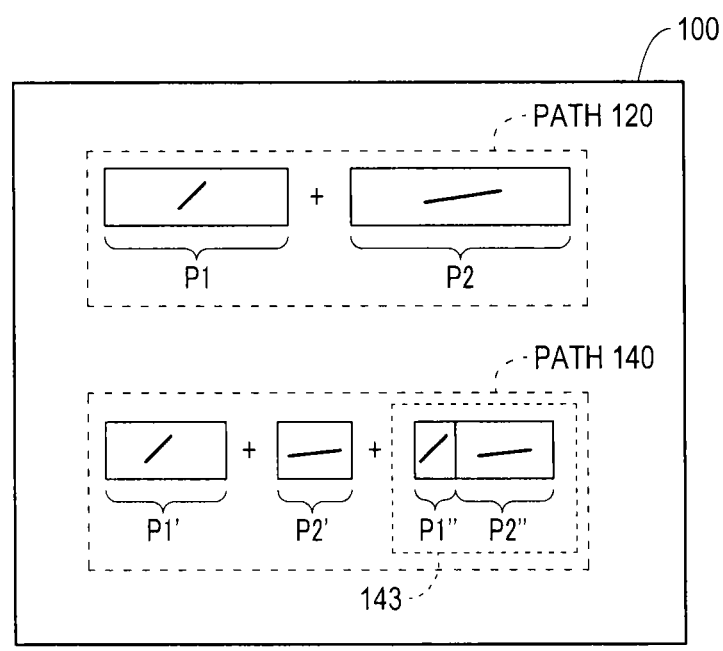
FIG. 1 shows a block diagram of integrated circuit 100 according to an embodiment of the disclosure.

FIG. 1 shows a block diagram of an integrated circuit example 100 according to an embodiment of the disclosure. It is noted that the integrated circuit 100 can be an integrated circuit (IC) chip. an IC package, or a circuit block, such as an intellectual property (IP) block within an IC chip. The integrated circuit 100 includes at least a pair of racing paths, such as path 120, and path 140. Generally, timing margins, such as setup-time margin, hold-time margin, and the like, are used to indicate how much "worse than worst case" the timings of racing paths can be without causing circuit failure, and positive timing margins are generally desirable. In an example, a negative setup-time margin indicates that the timings of the racing paths do not have enough margin and may cause circuit failure in a worst case of setup-time; and a positive setup-time margin indicates that the racing paths can perform correct function in a worst case of setup-time. The positive setup-time margin allows for unexpected circumstances, and is desirable to ensure correct circuit function under unexpected circumstances. The racing paths 120 and 140 are configured to have matched delay characteristics in response to changes in manufacturing, environmental, and operational parameters. Thus, a timing margin of the two racing paths 120 and 140 can be kept, for example, positive, regardless of changes in manufacturing, environmental and operational parameters.

In an example, the timing margin of the two racing paths 120 and 140 is positive for a first integrated circuit 100 and a second integrated circuit 100 having changed device parameters from the first integrated circuit 100 due to variations in manufacturing process. In another example, the timing margin of the two racing paths 120 and 140 is positive when environmental temperature variation is in a range, such as from −75° C. to +125° C. In another example, the timing margin of the two racing paths 120 and 140 is positive when supply voltage variation is in a range, such as ±10%.

Generally, delay of a path is contributed by multiple delay components, such as transistor-switching delay, passive RC delay, and the like. The multiple delay components may have different delay characteristics in response to changes in manufacturing, environmental, and operational parameters. In the FIG. 1 example, the delay of the racing paths 120 and 140 are contributed by a first delay component having a first characteristic, and a second delay component having a second characteristic. The first characteristic and the second characteristic have different change rates with regard to a parameter change or a collective parameters change of the manufacturing, environmental and operational parameters. In an example, variations of the manufacturing, environmental and operational parameters collectively define a fast corner, a typical corner, and a slow corner. The first characteristic has a relatively larger delay change rate when parameters change from one corner to another corner, such as from the faster corner to the typical corner, from the typical corner to the slow corner, and the like. The second characteristic has a relatively smaller delay change rate when the parameters change from one corner to another corner, such as from the faster corner to the typical corner, from the typical corner to the slow corner, and the like.

According to an aspect of the disclosure, the racing paths 120 and 140 are configured to have matched delay components, thus the racing paths 120 and 140 have matched delay characteristics in response to changes of the manufacturing, environmental and operational parameters. In an embodiment, at least one path includes an inserted circuit configured to reduce delay components mismatches between the racing paths 120 and 140.

Generally, during circuit design, one of the racing paths 120 and 140 includes an inserted delay circuit to satisfy a timing margin for the racing paths 120 and 140. According to an embodiment of the disclosure, the inserted delay circuit is configured to reduce delay characteristics mismatches between the racing paths 120 and the 140. Thus, when parameters shift from one corner to another corner, the delay changes of the racing paths 120 and 140 are about the same, and the timing margin can be kept regardless of the parameters shifts.

In an example, the delay components of the path 120 do not match the delay components of the path 140 in an initial design of the integrated circuit 100. For example, initially, the delay of the path 120 includes a portion P1 of the first delay component, and a portion P2 of the second delay component. The delay of the path 140 includes a portion P1' of the first delay component and a portion P2' of the second delay component. A ratio of the portion P1 and the portion P2 does not match a ratio of the portion P1' and the portion P2'. In the FIG. 1 example, the path 120 is second delay component dominant, and the path 140 is first delay component dominant. It is noted that the delay portions can be delay measures in time or can be normalized delays.

The initial design may satisfy a logic requirement, but may have a negative timing margin. Thus, a delay circuit 143 is inserted into the path 140 to achieve a positive timing margin at the typical corner, for example. In the FIG. 1 example, the delay circuit 143 is configured to reduce delay components mismatches between the racing paths 120 and 140. For example, the delay of the delay circuit 143 includes a portion P1" of the first delay component, and a portion P2" of the second delay component. As shown in FIG. 1, the delay circuit 143 is second delay component dominant. In an example, a ratio of (P1'+P1") and (P2'+P2") is substantially equal to a ratio of P1 and P2. In another example, (P1'+P1") is substantially equal to P1, and (P2'+P2") is substantially equal to P2. Thus, the racing paths 120 and the 140 have matched delay characteristics. In an example, when the timing margin is larger than a threshold at the typical corner, the timing margin is kept positive at the slow corner and the fast corner. As a result, design iterations to meet the timing margin across corners can be saved.

It is noted that, in an example, after the insertion of the delay circuit 143, an optimization design process may suitably combine the delay circuit 143 into an existing circuit of the path 140 in the initial design. In another example, the optimization design process may suitably distribute the delay circuit 143 into a number of existing circuits of the path 140.

Figure 2A:
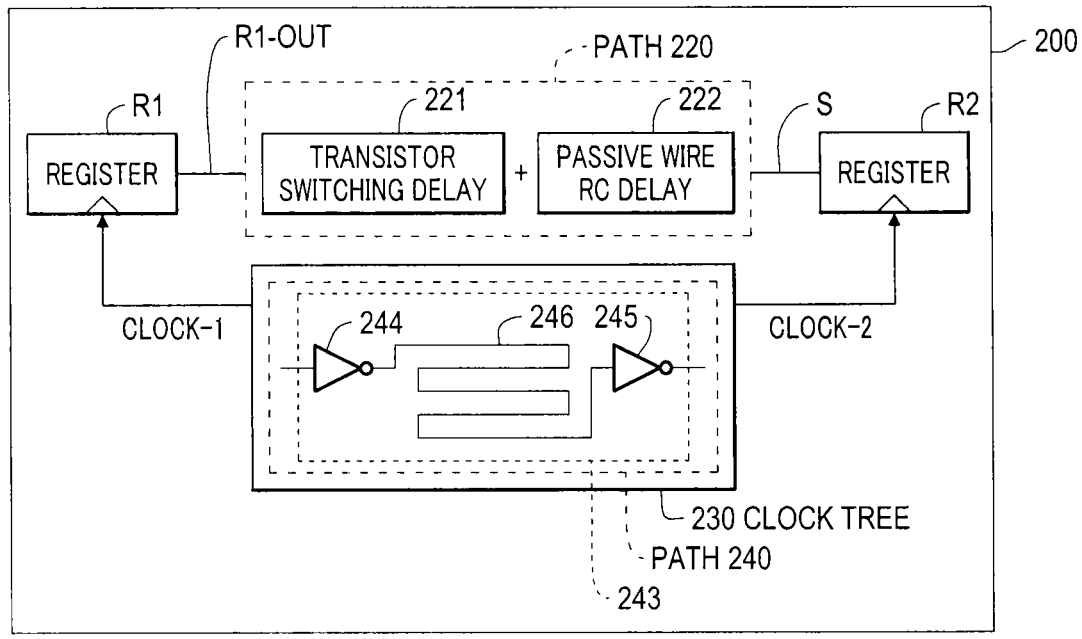
FIG. 2A shows a block diagram of integrated circuit 200 according to an embodiment of the disclosure and FIG. 2B shows waveform examples according to the integrated circuit 200 in FIG. 2A.

FIG. 2A shows a block diagram of an integrated circuit example 200 according to an embodiment of the disclosure. The integrated circuit 200 includes two registers R1 and R2, a signal path 220 between the register R1 and the register R2, and a clock tree 230 that provides clock signals CLOCK-1 and CLOCK-2 respectively to the register R1 and the register R2. The clock tree 230 includes a clock delay path 240 to generate a delay between the clock signal CLOCK-1 and the clock signal CLOCK-2. These elements are coupled together as shown in FIG. 2A.

According to an embodiment of the disclosure, the clock delay path 240 and the signal path 220 have matched delay characteristics in response to changes in manufacturing, environmental and operational parameters. Thus, delay changes of the clock delay path 240 and the signal path 220 are tracked substantially in response to changes in manufacturing, environmental and operational parameters, and timing margins of the clock delay path 240 and the signal path 220 can be kept positive regardless of the changes in the manufacturing, environmental and operational parameters.

Specifically, in an example, the signal path 220 includes transistors configured to perform required logic functions, and wires that interconnect the transistors, and connect the signal path 220 to the register R1 and the register R2. Thus, the delay of the signal path 220 includes a first portion of transistor-switching delay, and a second portion of passive RC delay.

The transistor-switching delay and the passive RC delay vary different in response to variations in the manufacturing, environmental and operational parameters. In an example, transistor-switching delay varies in response to manufacturing process variations, but the passive RC delay is substantially independent of process variations. For example, gate oxide thickness variation, channel doping concentration variation, and the like, can cause transistor threshold variation. The transistor threshold variation then causes transistor-switching delay variation. Generally, the passive RC delay is due to metal wires. Thus, given the same geometry of metallization, the passive RC delay is substantially independent of manufacturing process variation. In another example, both the transistor switching delay and the passive RC delay change with temperature variation, but the transistor switching delay and the passive RC delay may have different temperature coefficients.

In an embodiment, variations of the manufacturing, environmental, and operational parameters collectively define a fast corner, a typical corner, and a slow corner. For example, the fast corner is a combination of a fast process corner, a lower boundary of a temperature range, and an upper boundary of a supply voltage range; the typical corner is a combination of nominal process, a medium of the temperature range, and a medium of the supply voltage range; and the slow corner is a combination of a slow process corner, an upper boundary of the temperature range, and a lower boundary of the supply voltage range.

The transistor-switching delay and the passive RC delay vary differently with regard to the change of the corners. Specifically, the transistor-switching delay has a larger change rate than the passive RC delay. For example, when parameters change from the typical corner to the slow corner, the delay increase of the transistor-switching delay is much larger than the delay increase of the passive RC delay; and when the parameters change from the typical corner to the fast corner, the delay decrease of the transistor-switching delay is much larger than the delay decrease of the passive RC delay.

In an example, the integrated circuit 200 is a high-speed circuit that uses relatively high frequency clock signals CLOCK-1 and CLOCK-2, and the signal path 220 is a relatively slow path. To ensure correct circuit function, the clock delay circuit 240 is configured to delay the clock signal CLOCK-2 with regard to the clock signal CLOCK-1 to satisfy a setup-time criterion that requires the setup-time margin to be larger than a threshold at the typical corner. Further, the clock delay circuit 240 is configured to have matched delay characteristics as the signal path 220. Thus, the delay change of the clock delay circuit 240 tracks the delay change of the signal path 220 with regard to the parameters change from one corner to another corner. Then. the setup-time margin is kept positive from one corner to another corner to ensure the correct circuit function regardless of variations of the manufacturing, environmental and operational parameters.

According to an embodiment of the disclosure, buffers are inserted in the clock delay circuit 240 to delay CLOCK-2 with regard to CLOCK-1. In an example, a cell library includes a plurality of delay cells configured as buffers. For example, a first cell is transistor-switching delay dominant, and a second cell is passive RC delay dominant. It is noted that the cell library can include more than two cells to have different ratios of the transistor-switching delay to the passive RC delay. Thus, during circuit design, a suitable delay cell can be chosen to add delay and reduce delay characteristics mismatches between the signal delay path 220 and the clock delay path 240.

In an example, when the signal delay path 220 includes relatively long interconnection wires, for example, due to transistor placement and routing constrains, the signal delay path 220 can be passive RC delay dominant.

In an implementation example, buffers that have matched delay characteristics to the signal delay path 220 are inserted to delay CLOCK-2 with regard to CLOCK-1 to satisfy a setup-time margin at the typical corner. For example, at the typical corner, the set-up margin is larger than a threshold. When parameters shift to the fast corner, the delay decreases of the clock delay path 240 and the signal path 220 have about the same rate. When the threshold is suitably determined, the set-up margin can be kept positive at the faster corner.

In another implementation example, buffers that are transistor-switching delay dominant are inserted to delay CLOCK-2 with regard to CLOCK-1 to satisfy a setup-time margin at the typical corner. Due to the mismatches of the delay characteristics, when parameters shift to the fast corner, the delay decrease of the clock delay path 240 has a much larger decrease rate than the delay decrease of the signal path 220, and may cause the setup-time margin to be negative at the fast corner.

Figure 2B:
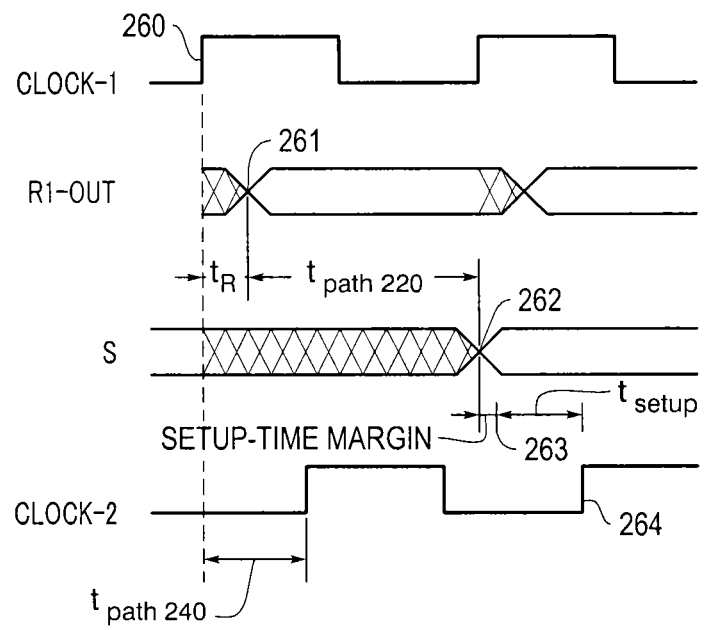

FIG. 2B shows waveform examples according to the integrated circuit 200 in FIG. 2A. FIG. 2B includes waveforms for the clock signals CLOCK-1 and CLOCK-2, the output signal of the register R1 (R1-OUT), and the output signal of the signal path 220 (S). In the FIG. 2B example, it is assumed that both registers R1 and R2 are rising-edge triggered registers, have a register delay $t_R$, and require a setup-time $t_{setup}$. The signal path 220 has a delay $t_{path220}$, and the clock delay path 240 has a delay $t_{path240}$.

When the register R1 is triggered by a rising-edge 260 of the clock signal CLOCK-1, the output signal R1-OUT is stable at a time 261 that is delayed by $t_R$ with regard to the rising-edge 260 of the clock signal CLOCK-1. Then, the output signal S of the signal path 220 is stable at a time 262 delayed by $t_{path220}$ with regard to the time 261. In order for the register R2 to operate correctly, the output signal S is required to be stable at least $t_{setup}$ before a rising-edge 264 of clock signal CLOCK-2. The latest stable time 263 for the output signal S is defined by $t_{setup}$ and the rising edge 264. The timing margin between the stable time 262 of the output signal S and the latest stable time 263 is the setup-time margin. The clock signal CLOCK-2 is suitably delayed by $t_{path240}$ with regard to the clock signal CLOCK-1 to ensure a positive setup-time margin.

It is noted that when the delay characteristics of the signal path 220 and the clock delay path 240 match, the delay change of the clock delay path 240 tracks the delay change of the signal path 220 in response to manufacturing, environmental, and operational parameters. Thus, when the setup-time margin is larger than a threshold at the typical corner, the setup-time margin can be kept positive for other corners, such as fast corner and slow corner.

Figure 3A:
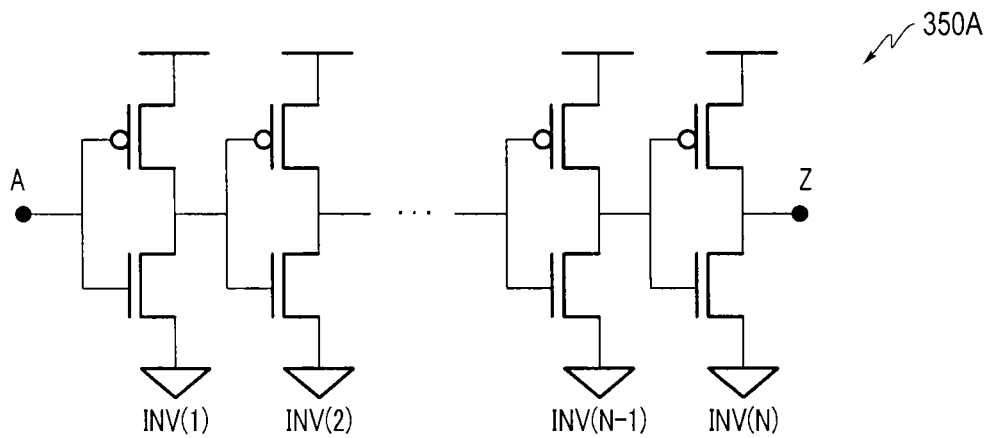
FIGS. 3A-3C show a circuit diagram of delay cells 350A to 350C according to an embodiment of the disclosure.

FIG. 3A shows a block diagram of a delay cell example 350A. The delay cell 350A includes a plurality of closely coupled inverters, such as INV(1) to INV(N) (N is a positive integer number). Thus, the delay cell 350A has a delay that is transistor-switching delay dominant. It is noted that a design library can have a plurality of delay cells 350A that have different numbers of inverters.

Figure 3B:
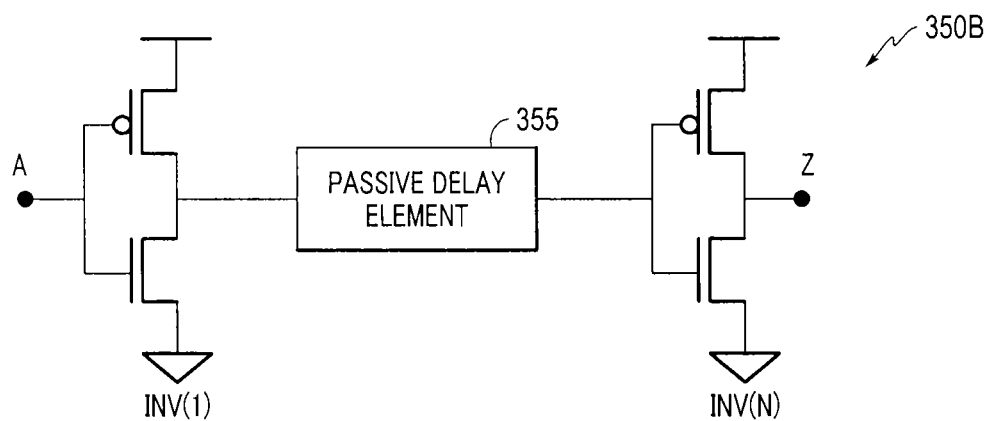

FIG. 3B shows a circuit diagram of a delay cell example 350B according to an embodiment of the disclosure. The delay cell 350B includes a first inverter INV(1) and a second inverter INV(2) and a passive delay element 355 coupled between the output of the first inverter INV(1) and the input of the second inverter INV(2). The passive delay element 355 can be suitably configured according to different delay characteristics requirements. In an example, the passive delay element includes one or more conductive wires. The conductive wires can be manufactured using any suitable material, such as metal wire, undoped polysilicon, p-type polysilicon, heavily doped p-type ($P^+$) polysilicon, n-type polysilicon, heavily doped n-type ($N^+$) polysilicon, and the like, based on delay characteristic requirements. For example, when a relatively small portion of passive RC delay component is required, the passive delay element 355 is implemented using metal wire. In another example, when the passive RC delay component is required to have a positive temperature coefficient, the passive delay element 355 is implemented using $N^+$ polysilicon, for example. In another example, when the passive RC delay component is required to have a negative temperature coefficient, the passive delay element 355 is implemented using $P^+$ polysilicon, for example.

It is noted that a design library can have a plurality of delay cells 350B. In an example, the plurality of delay cells 350B includes materials of various dimensions and characteristics to mimic different passive RC delay. In another example, the plurality of delay cells 350B includes various lengths of conductive wires to have different passive RC delay.

Figure 3C:
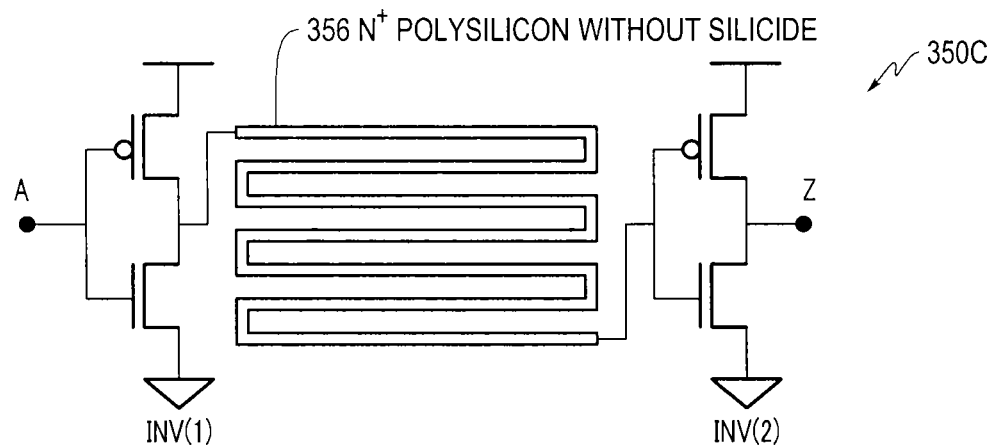

FIG. 3C shows a circuit diagram of a delay cell example 350C according to an embodiment of the disclosure. The delay cell 350C includes a first inverter INV(1) and a second inverter INV(2) and a wire 356 coupled between the output of the first inverter INV(1) and the input of the second inverter INV(2). In an embodiment, the design library is corresponding to an existing process that includes steps to manufacture conductive wires using $N^+$ polysilicon without silicide as resistors. In an example, wires of $N^+$ polysilicon without silicide have relatively large resistivity comparing to metal wires and have positive temperature coefficient as metal wires. Thus, a relatively short conductive wire is able to match the delay characteristics of relatively long metal wires. Then, the delay cell 350C has a relatively small footprint.

Figure 4:
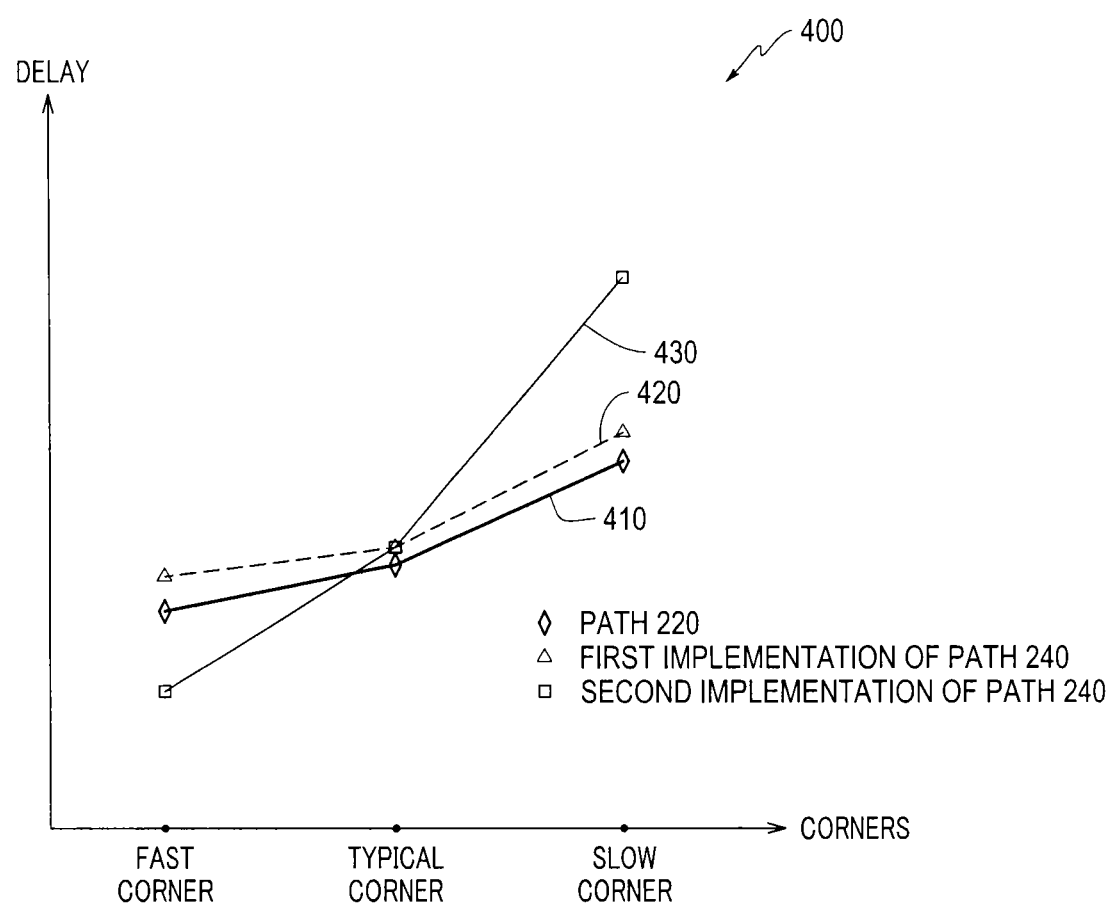
FIG. 4 shows a plot of path delay characteristics according to an embodiment of the disclosure.

FIG. 4 shows a plot 400 of delay characteristics examples according to an embodiment of the disclosure. In FIG. 4, X-axis is used to indicate corners, such as a faster corner, a typical corner and a slow corner collectively defined by the manufacturing, environmental and operational parameters, and Y-axis is used to indicate path delay or normalized path delay. The plot 400 includes a first curve 410 of delay characteristics for a path, such as the path 220, a second curve 420 of delay characteristics of a first implementation of a racing path to the path, such as the path 240, and a third curve 430 of delay characteristics of a second implementation of the path 240, for example.

The first implementation of the path 240 has matched delay characteristics to the delay characteristics of the path 220. Thus, when the parameters shift from one corner to another corner, the delay change of the path 240 tracks the delay change of the path 220, as shown by the second curve 420 tracking the first curve 410. In an example, when the first implementation is suitably configured to have a positive timing margin larger than a threshold at the typical corner, then the first implementation has positive timing margin at the fast corner and the slow corner.

The second implementation of the path 240 has mismatched delay characteristics to the delay characteristics of the path 220. When the parameters shift from one corner to another corner, the delay change of the path 240 is much larger to the delay change of the path 220, as shown by the third curve 430 compared to the first curve 410. In an example, the second implementation is suitably configured to have a timing margin, such as setup-time margin to be positive at the typical corner. However, when parameters change to the fast corner, the delay decrease of the path 240 in the second implementation is much larger than the delay decrease of the path 220, and causes the setup margin to be negative. Thus, the second implementation needs to be modified to satisfy the setup-time margin at the fast corner, for example, by adding more delay in the path 240. The addition of more delay in the path 240 may adversely affect other timing margins. For example, the addition of more delay in the path 240 can cause negative hold-time margin at the slow corner. According to an aspect of the disclosure, the design process needs to perform a number of iterations to modify the second implementation. Sometimes, the second implementation may not be able to achieve timing closure, and may need to sacrifice performance.

Figure 5:
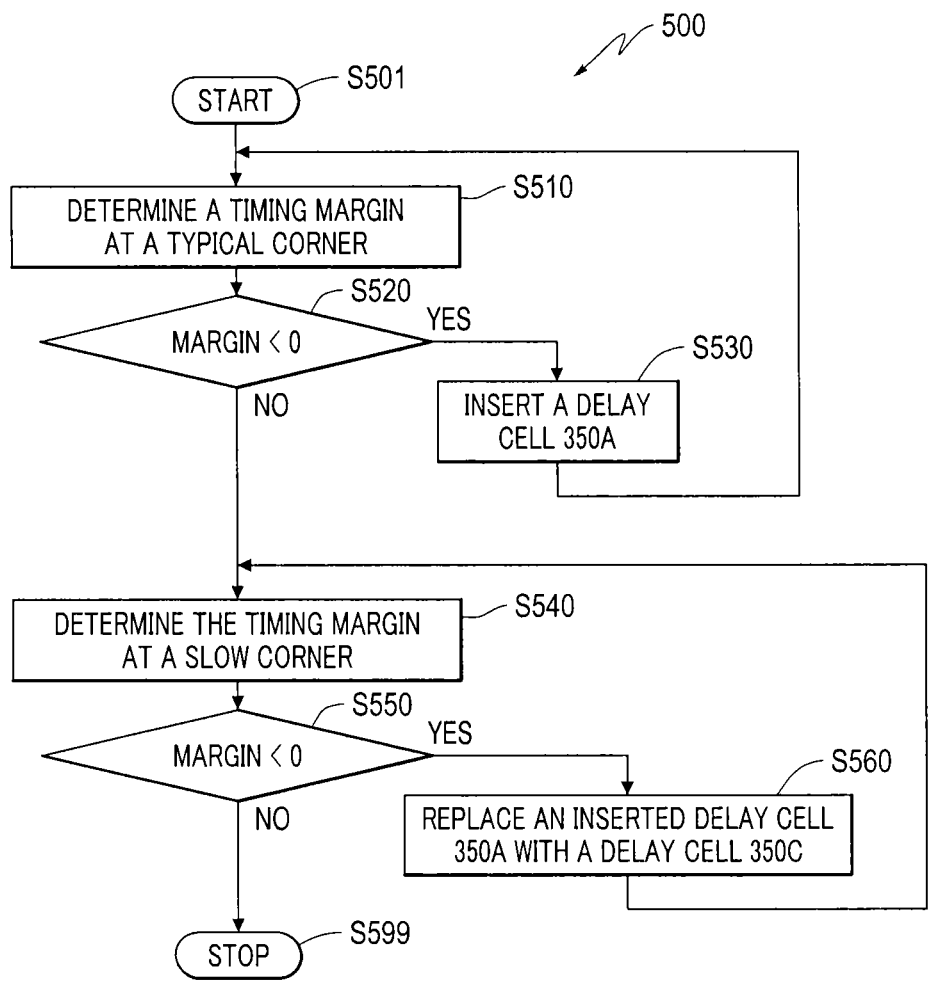
FIG. 5 shows a flow chart outlining a design process example 500 for timing closure according to an embodiment of the disclosure.

FIG. 5 shows a flowchart outlining a design process example 500 for timing closure according to an embodiment of the disclosure. It is noted that the design process 500 can be performed by a same party that performs an initial design, or can be performed by a different party that receives the initial design. The design process can be implemented as software codes stored in a storage medium. The software codes can be executed by one or more processors to conduct the design process 500. The design process starts at S501, and proceeds to S510.

At S510, the design process determines a timing margin, such as a hold-time margin, of a pair of racing paths at a typical corner, for example.

At S520, the design process compares the timing margin with a threshold and determines whether the timing margin satisfies a margin requirement. For example, the design process determines whether the timing margin is smaller than zero. When the timing margin is smaller than zero, the design process proceeds to S530; otherwise, the design process proceeds to S540.

At S530, the design process inserts a delay cell, such as the delay cell of 350A that is transistor-switching delay dominant, to one of the racing paths to increase the timing margin. Then the process returns to S510.

At S540, the design process determines the timing margin of the two racing paths at another corner that is adversely affected by the insertion of transistor switching delay dominant cells, such as a slow corner for a hold-time margin in an example.

At S550, the design process determines whether the timing margin is smaller than zero. When the timing margin is smaller than zero, the process proceeds to S560; otherwise, the process proceeds to S599 and terminates.

At S560, the design process replaces an inserted delay cell 350A with a delay cell 350C that is passive RC delay dominant, for example, to reduce delay characteristics mismatches. In an embodiment, the delay cell 350C and the delay cell 350A are configured to have substantially the same delay at the typical corner. When the delay cell 350C replaces the delay cell 350A, the timing margin does not change at the typical corner, and is improved at the slow corner. Then the process returns to S540.

Figure 6:
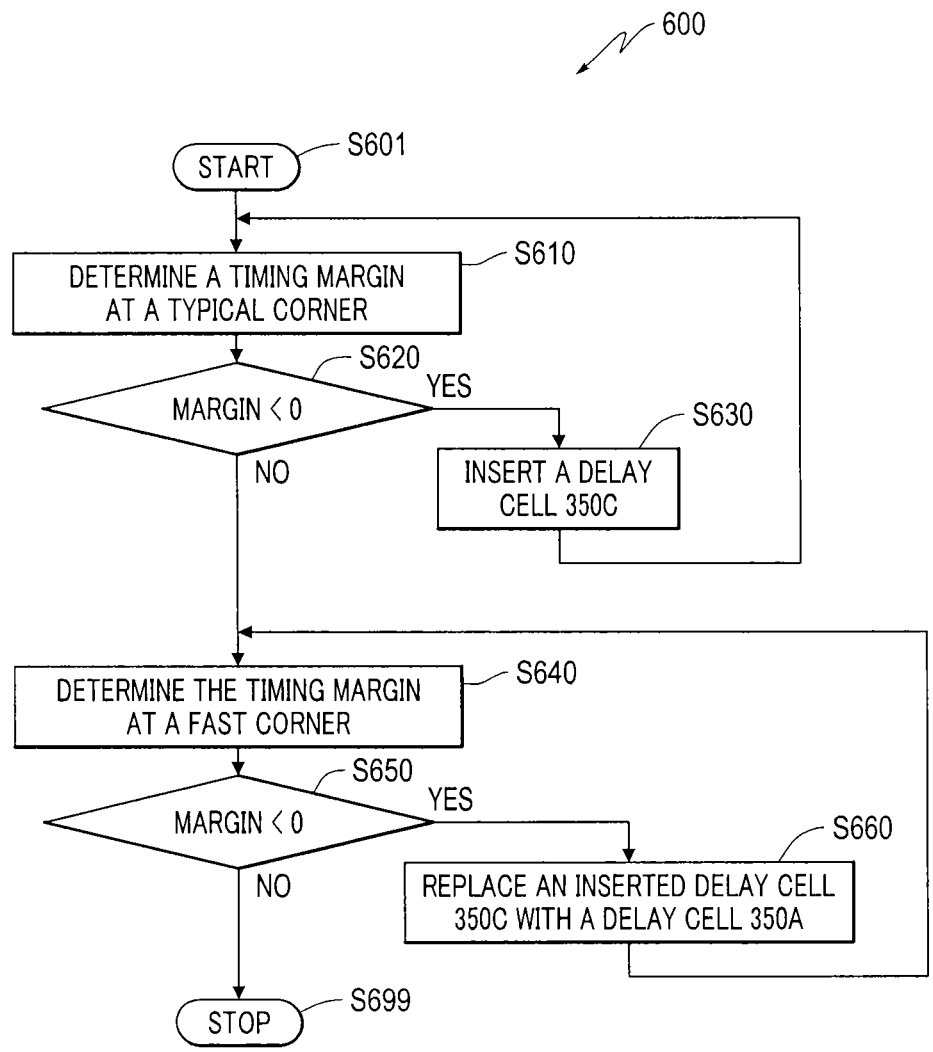
FIG. 6 shows a flow chart outlining another design process example 600 for timing closure according to an embodiment of the disclosure.

FIG. 6 shows a flow chart outlining another design process example 600 for timing closure according to an embodiment of the disclosure. Similar to the design process 500, the design process 600 can be performed by a same party that performs an initial design, or can be performed by a different party that receives the initial design. The design process 600 can be implemented as software codes stored in a storage medium. The software codes can be executed by one or more processors to conduct the design process 600. The design process starts at S601, and proceeds to S610.

At S610, the design process determines a timing margin, such as a hold-time margin, of a pair of racing paths at a typical corner, for example.

At S620, the design process compares the timing margin with a threshold and determines whether the timing margin satisfies a margin requirement. For example, the design process determines whether the timing margin is smaller than zero. When the timing margin is smaller than zero, the design process proceeds to S630; otherwise, the design process proceeds to S640.

At S630, the design process inserts a delay cell, such as the delay cell of 350C that is passive RC delay dominant, to one of the racing paths to increase the timing margin. Then the process returns to S610.

At S640, the design process determines the timing margin of the two racing paths at another corner that is adversely affected by the insertion of passive RC delay dominant cells, such as a fast corner for a hold-time margin in an example.

At S650, the design process determines whether the timing margin is smaller than zero. When the timing margin is smaller than zero, the process proceeds to S660; otherwise, the process proceeds to S699 and terminates.

At S660, the design process replaces an inserted delay cell 350C with a delay cell 350A that is transistor switching delay dominant, for example, to reduce delay characteristics mismatches. In an embodiment, the delay cell 350C and the delay cell 350A are configured to have substantially the same delay at the typical corner. When the delay cell 350A replaces the delay cell 350C, the timing margin does not change at the typical corner, and is improved at the fast corner for the hold-time margin. Then the process returns to S640.

It is noted that the processes 500 and 600 can be suitably modified to satisfy other timing margin, such as a setup-time margin, and the like.

Figure 7:
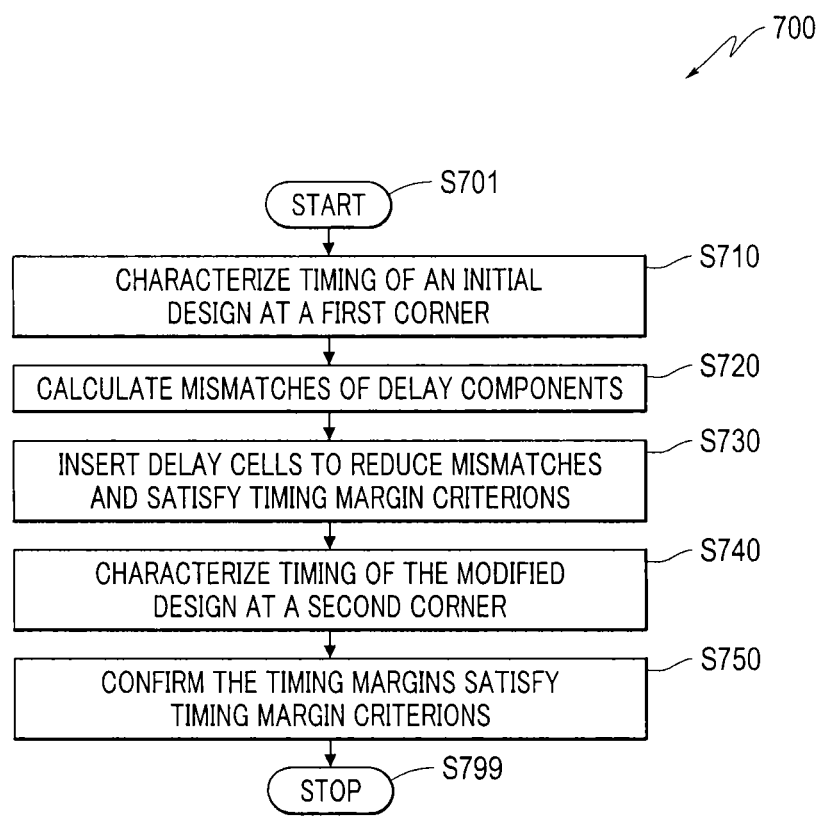
FIG. 7 shows a flow chart outlining another design process example 700 for timing closure according to an embodiment of the disclosure.

FIG. 7 shows a flow chart outlining another design process example 700 for timing closure according to an embodiment of the disclosure. Similar to the design processes 500 and 600, the design process 700 can be performed by a same party that performs an initial design, or can be performed by a different party that receives the initial design. The design process 700 can be implemented as software codes stored in a storage medium. The software codes can be executed by one or more processors to conduct the design process 700.

According to an embodiment of the disclosure, the design process 700 is based on a library that includes transistor switching delay dominant cells (TDC) and passive RC delay dominant cells (WDC). In an example, a WDC cell is configured to include a delay component due to transistor switching delay (t_tDelay_wdc) and a delay component of passive RC delay (t_wDelay_wdc), and a TDC cell is configured to include mainly transistor switching wire delay (t_tDelay_tdc). It is noted that the library can have TDC cells and WDC cells configured to have various proportions of passive RC delays. It is also noted that the TDC cells and the WDC cells are also configured to have various driving strength.

The design process starts at S701, and proceeds to S710.

At S710, the design process characterizes the timing of the initial design at a first corner. It is noted that the initial design can include any suitable circuit design information that is available, such as logic design, placement, and routing information, and the like. The design process characterizes the timing of the initial design based on the circuit design information. In an example, the design process characterizes timings of two racing paths at the first corner. For example, the design process characterizes transistor switch delay components and passive RC delay components respectively for a first path and a second path.

At S720, the design process calculates mismatches of delay components. In an example, the design process calculates a transistor switch delay mismatch component (t_td_mismatch) and a passive RC delay mismatch component (t_wd_mismatch) that collectively cause a timing margin of the first path with regard to the second path to be negative.

At S730, the design process inserts delay cells to reduce mismatches of the delay components. In an example, the design process calculates a number of WDC cells (N_wdc), and a number of TDC cells (N_tdc) to be inserted in the first path according to Eq. 1 and Eq. 2.

$$N\_wdc = t\_wd\_mismatch / t\_wDelay\_wdc \qquad \text{Eq. 1}$$

$$N\_tdc = [t\_td\_mismatch - (N\_wdc \times t\_tDelay\_wdc)] / t\_tDelay\_tdc \qquad \text{Eq. 2}$$

When N_tdc is positive, TDC cells are inserted in the first path, and when N_tdc is negative, TDC cells are inserted in the second path.

At S740, the design process characterizes the timing of the modified design at a second corner. In an example, the design process characterizes transistor switch delay component and passive RC delay component for the modified first path and second path at the second corner.

At S750, the design process confirms that the timing margins satisfy the timing margin criterions. In an example, the design process confirms that the timing margin of the modified first path with regard to the second path is positive. Then, the design process proceeds to S799 and terminates. However, in an example, when the timing margin of the modified first path with regard to the second path fails to be positive, the process may proceed to a debugging step (not shown) that a circuit designer starts to investigate the failure.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A circuit, comprising:
   a first circuit including at least two heterogeneous delay components; and a second circuit including at least two delay circuits, each of the at least two delay circuits including at least two heterogeneous delay components, the at least two heterogeneous delay components being configured to cause the second circuit to have substantially matched delay characteristics of the first circuit, wherein the at least two heterogeneous delay components of the first circuit have a first delay P1 and a second delay P2 and the at least two heterogeneous delay components of the at least two delay circuits of the second circuit have a third delay P3, a fourth delay P4, a fifth delay P5, and a sixth delay P6, and a ratio of a first function of (P3 and P5) to a second function of (P4 and P6) is substantially based on a ratio of P1 to P2.

2. The circuit of claim 1, wherein each of the at least two heterogeneous delay components of the first circuit and the second circuit has a delay characteristic that varies differently in response to a change in a parameter associated with the first and second circuits.

3. The circuit of claim 2, wherein the change in the parameter includes one or more changes in manufacturing, environmental, and operational parameters.

4. The circuit of claim 1, wherein a ratio of a first sum of a first pair of delays of the at least two heterogeneous delay components of the at least two delay circuits to a second sum of a second pair of delays of the at least two heterogeneous delay components of the at least two delay circuits is substantially based on a ratio of a first delay of the at least two heterogeneous delay components of the first circuit and a second delay of the at least two heterogeneous delay components of the first circuit.

5. The circuit of claim 1, wherein a first delay characteristic of the at least two heterogeneous delay components of the first circuit characterizes transistor-switching delay, and a second delay characteristic of the at least two heterogeneous delay components of the first circuit characterizes passive RC delay.

6. The circuit of claim 1, wherein one of the at least two delay circuits comprises:
a portion configured to add passive RC delay.

7. The circuit of claim 6, wherein the portion comprises at least a portion of doped polysilicon.

8. The circuit of claim 7, wherein the portion of doped polysilicon is n-type doped polysilicon.

9. A method for circuit design, comprising:
inserting at least two heterogeneous delay components into a first circuit;
inserting at least two delay circuits into a second circuit, each of the at least two delay circuits including at least two heterogeneous delay components;
configuring, by a computer, the at least two heterogeneous delay components of the at least two delay circuits of the second circuit to cause the second circuit to have substantially matched delay characteristics of the first circuit, wherein the at least two heterogeneous delay components of the first circuit have a first delay P1 and a second delay P2 and the at least two heterogeneous delay components of the at least two delay circuits of the second circuit have a third delay P3, a fourth delay P4, a fifth delay P5, and a sixth delay P6:
configuring a ratio of a first function of (P3 and P5) to a second function of (P4 and P6) substantially based on a ratio of P1 to P2; and
fabricating at least one of the first circuit and the second circuit.

10. The method of claim 9, further comprising:
detecting a mismatch of delay characteristics of the first circuit and the second circuit in response to a change in a parameter associated with the first and second circuits.

11. The method of claim 10, wherein the change in the parameter includes one or more changes in manufacturing, environmental, and operational parameters.

12. The method of claim 9, further comprising:
configuring a ratio of a first sum of a first pair of delays of the at least two heterogeneous delay components of the at least two delay circuits to a second sum of a second pair of delays of the at least two heterogeneous delay components of the at least two delay circuits substantially based on a ratio of a first delay of the at least two heterogeneous delay components of the first circuit and a second delay of the at least two heterogeneous delay components of the first circuit.

13. The method of claim 9, further comprising:
characterizing transistor-switching delay as a first delay characteristic of the at least two heterogeneous delay components of the first circuit; and
characterizing passive RC delay as a second delay characteristic of the at least two heterogeneous delay components of the first circuit.

14. The method of claim 9, further comprising:
configuring a portion of one of the at least two delay circuits to add passive RC delay.

15. The method of claim 14, wherein the portion comprises at least a portion of doped polysilicon.

16. The method of claim 15, wherein the portion of doped polysilicon is n-type doped polysilicon.

* * * * *